(12) United States Patent
Keenan et al.

(10) Patent No.: US 7,470,304 B2
(45) Date of Patent: Dec. 30, 2008

(54) PROCESS FOR THE MANUFACTURE OF SULPHUR-CONTAINING AMMONIUM PHOSPHATE FERTILIZERS

(75) Inventors: Kenneth William Keenan, Calgary (CA); William Patrick Kennedy, Calgary (CA)

(73) Assignee: Shell Oil Company, Houston, TX (US)

( * ) Notice: Subject to any disclaimer, the term of this patent is extended or adjusted under 35 U.S.C. 154(b) by 612 days.

(21) Appl. No.: 10/534,214

(22) PCT Filed: Nov. 12, 2003

(86) PCT No.: PCT/EP03/50821

§ 371 (c)(1),
(2), (4) Date: May 6, 2005

(87) PCT Pub. No.: WO2004/043878

PCT Pub. Date: May 27, 2004

(65) Prior Publication Data

US 2006/0144108 A1 Jul. 6, 2006

(30) Foreign Application Priority Data

Nov. 14, 2002 (EP) .................................. 02257854

(51) Int. Cl.
*C05B 7/00* (2006.01)
(52) U.S. Cl. .......................................................... 71/34
(58) Field of Classification Search ........................ 71/34
See application file for complete search history.

(56) References Cited

U.S. PATENT DOCUMENTS

| | | | | |
|---|---|---|---|---|
| 3,333,939 A | * | 8/1967 | Davis et al. ..................... | 71/29 |
| 4,032,319 A | | 6/1977 | Smith et al. ..................... | 71/34 |
| 4,377,406 A | | 3/1983 | Achorn et al. .................. | 71/36 |
| 4,762,546 A | | 8/1988 | Boles ............................. | 71/30 |
| 5,571,303 A | | 11/1996 | Bexton ........................... | 71/34 |
| 5,653,782 A | | 8/1997 | Stern et al. ..................... | 71/53 |
| 6,344,066 B1 | * | 2/2002 | Eyal ............................... | 71/34 |
| 2002/0011088 A1 | | 1/2002 | Peacock et al. ............. | 71/64.02 |

FOREIGN PATENT DOCUMENTS

| | | |
|---|---|---|
| JP | 56 109888 | 8/1981 |
| RU | 2164506 C1 | 3/2001 |
| WO | 92/10270 | 6/1992 |

OTHER PUBLICATIONS

International Search Report dated Mar. 22, 2004.

* cited by examiner

*Primary Examiner*—Wayne Langel

(57) ABSTRACT

The invention relates to a process for the manufacture of sulphur-containing fertilizers comprising the steps of: (a) mixing ammonia, phosphoric acid and water in a reactor unit to obtain an ammonium phosphate mixture; (b) introducing the mixture obtained in step (a) into a granulator unit to obtain granules, wherein a liquid phase comprising elemental sulphur is brought into contact with ammonia, phosphoric acid and water in the reactor unit in step (a) or is introduced in the granulator unit in step (b). The invention further relates to sulphur-containing ammonium phosphate fertilizers, to the use of these sulphur-containing fertilizers to promote the growth of agricultural products and to the agricultural products thus-obtained.

18 Claims, 1 Drawing Sheet

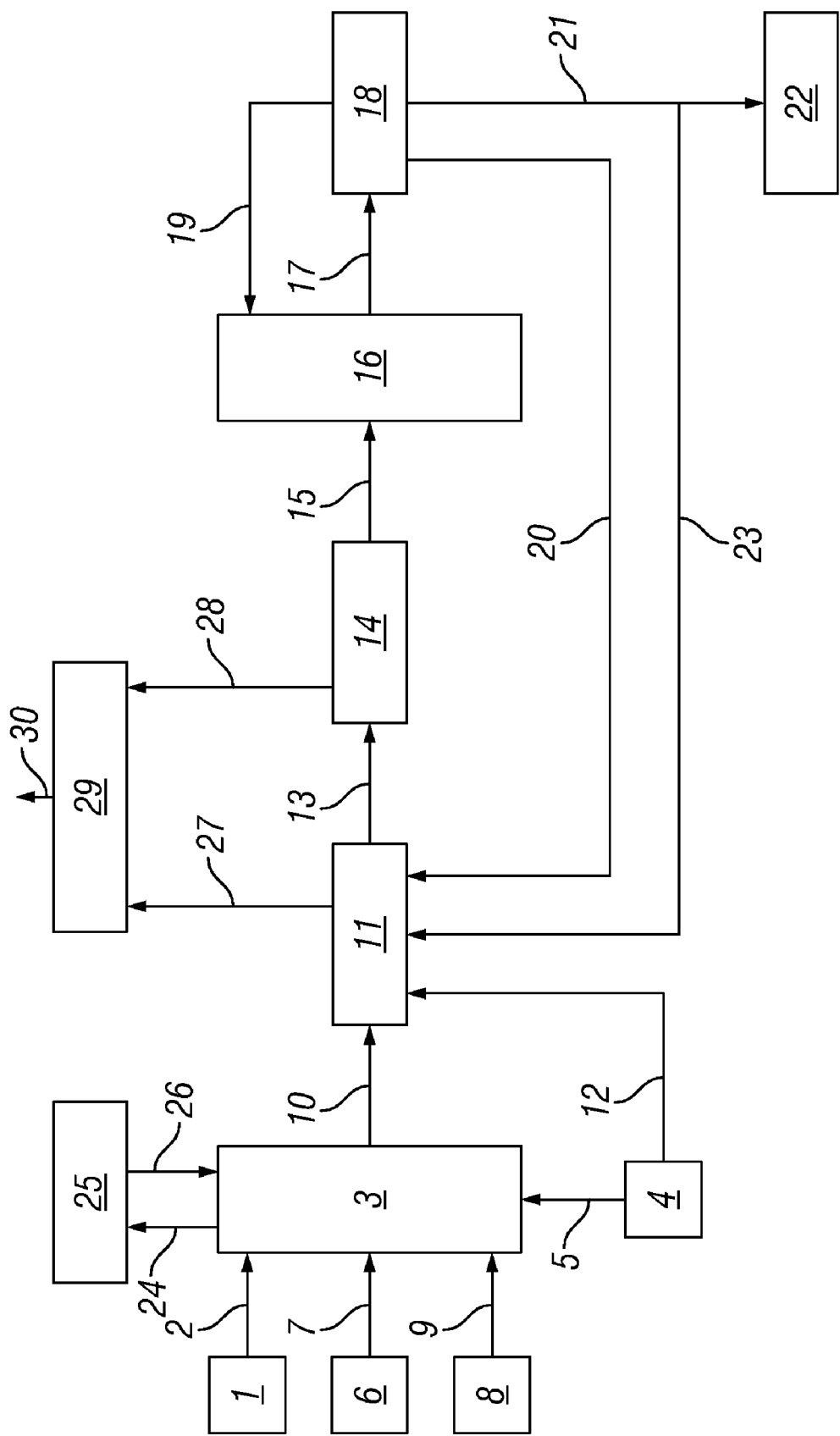

PROCESS FOR THE MANUFACTURE OF SULPHUR-CONTAINING AMMONIUM PHOSPHATE FERTILIZERS

PRIORITY CLAIM

The present application claims priority to European Patent Application No. 02257854.6 filed 14 Nov. 2002.

FIELD OF THE INVENTION

The invention relates to a process for the manufacture of sulphur-containing ammonium phosphate fertilizers.

The invention further relates to sulphur-containing fertilizers of the ammonium phosphate type, such as sulphur-containing diammonium phosphate (S-DAP), sulphur-containing mono-ammonium phosphate (S-MAP) or ammonium phosphate based sulphur-containing nitrogen-phosphorous-potassium compounds (S-NPK).

The invention further relates to the use of these sulphur-containing fertilizers, especially to grow agricultural products on sulphur-deficient soil.

The invention also relates to the agricultural products grown on soil, especially on sulphur-deficient soil which has been treated with the sulphur-containing fertilizers of the present invention.

BACKGROUND OF THE INVENTION

In the past a tremendous amount of work has been devoted to the manufacture of sulphur-containing fertilizers. The growing worldwide demand for sulphur-containing fertilizers stems from the discovery that low crop yields in certain cases may be related to deficiencies in sulphur in the soil. An example of a species with high sulphur requirements is Canola. Canola is an important cash crop in Alberta, Canada, and has high sulphur requirements at any growth stage. A shortage of sulphur can cause serious reductions in crop yield.

Manufacturing processes for sulphur-containing fertilizers of the ammonium phosphate type often involve the use or incorporation of sulphates, see e.g. U.S. Pat. Nos. 4,377,406, or 4,762,546. A disadvantage of sulphates is that they are very mobile in the soil and leachable. Elemental sulphur is not leached out of the soil, as are sulphates. It is therefore more advantageous to have the sulphur present as elemental sulphur. Furthermore, elemental sulphur offers some additional benefits in fertilizers: elemental sulphur acts as a fungicide against certain micro organisms, as a pesticide against certain soil and plant pests, it assists the decomposition of plant residues and it improves phosphorus and nitrogen utilization and reduces the pH of alkaline and calcareous soils.

Thus, it is advantageous to incorporate sulphur as elemental sulphur in the sulphur-containing fertilizers.

Processes for the manufacture of sulphur-containing fertilizers, wherein elemental sulphur is used, are known in the art. Most of the methods involve the incorporation of molten sulphur into the fertilizer.

In U.S. Pat. No. 5,653,782, a process for the manufacture of sulphur-containing fertilizers has been described, wherein a substrate containing fertilizer particles is heated to a temperature above the melting point of sulphur and admixed with sulphur. According to U.S. Pat. No. 5,653,782, the sulphur is melted by the heat provided by the preheated fertilizer particles, thereby producing a homogeneous coating on the fertilizer particles.

U.S. Pat. No. 3,333,939, describes the coating of ammonium phosphate granules with molten sulphur. The granules are coated in a separate coating unit into which the sulphur is fed, by contacting the granules with molten sulphur or with a solution of ammonium polysulphide. Subsequently, the coated granules are dried. Alternatively, U.S. Pat. No. 3,333,939 teaches a process for preparing sulphur-containing fertilizer particles in which the sulphur is interspersed throughout the particles. In this process ammonia and phosphoric acid are allowed to react to form ammonium phosphate. The ammonium phosphate formed is fed into a granulator in which it is mixed with urea and dry sulphur. The granules obtained are dried in a dryer. The disadvantage of the first process of U.S. Pat. No. 3,333,939 is that the coating prevents a uniform distribution of ammonium sulphate and sulphur into the soil. The second process has the disadvantage that it requires solid sulphur handling. The handling and grinding of solid sulphur is highly hazardous due to the dust and risks of explosions. As mentioned in a review by H. P. Rothbaum et al (New Zealand Journal of Science, 1980, vol. 23, 377), explosion hazards are always due to sulphur dust which is inflammable. Therefore, a more complex process design is necessary to ensure the safety of the process.

U.S. Pat. No. 5,571,303 discloses a process for the manufacture of fertilizers in which first ammonia, water and phosphoric acid are reacted to form ammonium phosphate. Subsequently, the ammonium phosphate/water mixture is mixed with molten sulphur. The mixture thus obtained is kept at temperatures of 120-150° C. until granulation. A disadvantage of this process is that due to the preforming of ammonium phosphate either much water is needed to keep the salt dissolved or, when relatively small amounts of water are used, solid ammonium phosphate is formed. The homogeneous distribution of sulphur throughout the granule may be hampered by the existence of solid ammonium phosphate.

Since problems with the manufacture of fertilizers of the sulphur-containing ammonium-phosphate type, continue to be in existence, there is a need for a manufacturing process for such fertilizers which would diminish or even prevent the problems experienced in the art.

It has now been found that a process for manufacturing sulphur-containing fertilizers, wherein sulphur is introduced as a liquid phase comprising elemental sulphur, offers advantages over the manufacturing processes known in the art, with regard to safety aspects as well as with respect to process control.

The process according to the invention enables the manufacture of fertilizers with an even distribution of sulphur throughout the fertilizer product, thereby enhancing conversion in the soil to plant usable form, namely sulphates. The fertilizer is thus enabled to deliver sulphates to the intended crop in a more reliable and consistent manner.

SUMMARY OF THE INVENTION

The invention therefore provides a process for the manufacture of sulphur-containing fertilizers comprising the steps of:

(a) mixing ammonia, phosphoric acid and water in a reactor unit to obtain an ammonium phosphate mixture;

(b) introducing the mixture obtained in step (a) into a granulator unit to obtain granules, wherein a liquid phase comprising elemental sulphur is brought into contact with ammonia, phosphoric acid and water in the reactor unit in step (a) or is introduced in the granulator unit in step (b).

BRIEF DESCRIPTION OF THE DRAWING

The FIGURE depicts a process scheme according to the invention.

DETAILED DESCRIPTION OF THE INVENTION

In step (a) of the process according to the invention, ammonia, phosphoric acid and water are contacted in a reactor unit to obtain an ammonium phosphate mixture. The phosphoric acid is typically manufactured by reacting sulphuric acid with phosphate or is commercially available phosphoric acid. Suitable phosphoric acids are for example orthophosphoric acid, or pyrophosphoric acid or mixtures thereof. To avoid the introduction of excess process water, the ammonia is preferably introduced as a concentrated aqueous solution or as anhydrous gaseous ammonia. The advantage of having a mixture with as little water as possible is that any additional water introduced into a fertilizer process must be handled in the process and eliminated at a later stage. Therefore, any additional water introduced into fertilizer manufacturing processes leads to a more complex process. Preferably, the water content in the ammonium phosphate mixture is kept as low as possible, preferably between approximately 10 and 20% based on the total weight of the mixture, more preferably between 12 and 15% based on the total weight of the mixture.

The amounts of ammonia and phosphoric acid are adjusted to achieve the desired products. For the production of S-MAP, the molar ratio of ammonia and phosphoric acid is typically kept between values of about 0.5-1.0, for the production of S-DAP the molar ratio of ammonia and phosphoric acid is typically kept between values of about 1.2-2.0 and for the production of S-NPK the molar ratio of ammonia and phosphoric acid is typically kept between values of about 0.7-1.7. Preferred values for the ammonia:phosphoric acid molar ratios are about 0.6-0.8 for the production S-MAP, 1.3-1.8 for the production S-DAP and about 1.0-1.5 for S-NPK. More preferred values for the ammonia:phosphoric acid molar ratios are about 0.7 for the production S-MAP, about 1.5 for the production S-DAP and about 1.3 for NPK.

Typically, the mixing takes place at atmospheric pressure and at temperatures between about 100° C. and about 130° C. Preferably, water or sulphuric acid is added to the reactor unit to control the temperature of the mixture. Typically, water is added when a temperature reduction is needed, sulphuric acid is added to when a temperature increase is needed.

In one embodiment of the process according to the invention, a liquid phase comprising elemental sulphur is brought into contact with ammonia, phosphoric acid and water in the reactor unit in step (a). In a preferred embodiment, ammonia, phosphoric acid, water and a sulphur slurry comprising a sulphur dispersion are mixed in a reactor unit to obtain an ammonium phosphate mixture; this mixture is then introduced into a granulator unit to obtain granules. In another embodiment of the process according to the invention, ammonia, phosphoric acid and water are mixed in a reactor unit to obtain an ammonium phosphate mixture; this mixture is then introduced into a granulator unit to obtain granules, while a liquid phase comprising elemental sulphur is also introduced in the granulator unit in step (b).

In a preferred process according to the invention, elemental sulphur is introduced into the reactor unit in step (a) substantially at the same time as the other reactants. It has been found that the crushing strength of the granules can be improved if the sulphur is added into the reactor unit in step (a).

In a preferred process, the elemental sulphur is introduced as a slurry of water and sulphur particles. Typically, the sulphur particles are dispersed or suspended in the slurry. Preferably, the particles have a size ranging from between about 0.5 to about 150 microns, preferably between about 1.0 and about 100 microns. To avoid the removal of excess water at a later stage in the process, the water content in the sulphur slurry is typically kept as low as possible, preferably between approximately 10 and 40% based on the total weight of the mixture, more preferably between 15 and 30% based on the total weight of the slurry. In the case where the sulphur particles are suspended in the slurry, the sulphur slurry is preferably stirred or mixed in a suitable apparatus to homogenise the slurry prior to introducing it into the manufacturing process. In a preferred embodiment, the sulphur slurry contains sulphur particles which are dispersed in the water. This type of slurry, henceforth referred to as dispersed or emulsified sulphur slurry, comprises dispersed sulphur particles in water, preferably dispersed micron-sized sulphur particles in water. The sulphur particles are suitably kept in dispersion through the addition of a suitable emulsifier. Suitable emulsifiers are known in the art and are not critical to the invention. An advantage of using dispersed sulphur particles is that the precipitation of sulphur particles is kept to a minimum and the sulphur is distributed more homogeneously throughout the water. Thus, the need for stirring or mixing prior to introducing the sulphur slurry into the reactor unit is reduced. Typically, the slurry is introduced by pumping the slurry from a sulphur slurry reservoir unit into the reactor unit.

In yet another preferred process according to the invention, the elemental sulphur is introduced into the reactor unit in step (a) as molten sulphur. Molten sulphur can be obtained from solid sulphur, by melting in a suitable melting apparatus, for instance a tube melter.

The use of molten sulphur is advantageous when sulphur is obtained in the molten state from an industrial process. Processes for the removal of unwanted sulphur components from natural gas usually produce sulphur in the molten state and the use of this molten sulphur directly in the fertilizer manufacturing process according to the invention avoids the need for additional steps, such as drying and grinding of the sulphur, to obtain a sulphur slurry. An additional advantage of using molten sulphur is that no additional water is introduced into the fertilizer manufacturing process. When adding elemental sulphur in the molten state, the temperature of the sulphur-containing mixture is preferably kept above the melting point of sulphur, preferably between temperatures of 115° C. and 121° C.

In an especially preferred process according to the invention, biologically produced elemental sulphur is used. Reference herein to biologically produced elemental sulphur is to sulphur obtained from a process wherein sulphur-containing components, such as sulphides or H2S, are converted to elemental sulphur via biological conversion. Biological conversion can suitably be effected using sulphide-oxidising bacteria. Suitable sulphide-oxidising bacteria can be selected for instance from the known autotropic aerobic cultures of the genera Thiobacillus and Thiomicrospira. An example of a suitable biological conversion process to obtain the biologically produced elemental sulphur suitable for the process according to the invention is the process for the removal of sulphur compounds from gases wherein the gas is washed with an aqueous washing liquid and the washing liquid is subjected to sulphide-oxidising bacteria, as described in WO 92/10270. Biologically produced elemental sulphur has a hydrophilic nature, making it especially suitable for agricultural use as fertilizer due to the relative ease with which the biologically produced sulphur is taken up by the soil. An additional advantage of biologically produced elemental sulphur is that fouling or blocking of equipment is substantially reduced or even eliminated due to the hydrophilic nature.

The reactor unit used in step (a) is any device wherein the ammonia, phosphoric acid and water are reacted to obtain an ammonium phosphate mixture, for example a pipe cross reactor or a preneutralizer unit. A preneutralizer unit comprises a tank reactor equipped with mixing equipment and appropriate inlet and outlet devices. In a preferred embodiment, a liquid phase comprising elemental sulphur is introduced in step (a) and a preneutralizer unit is used. In the preneutralizer unit, the starting components are mixed using a stirring device and ammonia is typically introduced as gaseous ammonia. The advantage of using a preneutralizer unit when elemental sulphur is introduced in step (a) is that a larger amount of sulphur can be used without experiencing operating problems such as clogging, most likely due to a more effective mixing. Another advantage of using a preneutralizer unit in step (a) is that the resulting sulphur-containing granules obtained after step (b) are stronger, reflected in their higher crush strength, even at higher amounts of sulphur in the granule. In a pipe cross reactor, the liquid phase comprising elemental sulphur, water and phosphoric acid are simultaneously fed in a pipe reactor through which the reactants are passed.

After step (a), a mixture comprising ammonium phosphate, water and optionally elemental sulphur is obtained. In step (b) of the process according to the invention, this mixture is introduced into a granulator unit to obtain granules.

In a preferred embodiment, ammonia, phosphoric acid and water are mixed in a reactor unit to obtain an ammonium phosphate mixture; this mixture is then introduced into a granulator unit to obtain granules, while a slurry comprising elemental sulphur is also introduced in the granulator unit in step (b).

In a preferred process, the elemental sulphur is introduced into the granulator unit as a slurry of water and sulphur particles, including suspended sulphur or dispersed sulphur, as hereinbefore described.

In an especially preferred process according to the invention, the elemental sulphur is introduced into the granulator unit as a slurry of water and biologically produced elemental sulphur particles, including suspended sulphur or dispersed sulphur as hereinbefore described.

Reference herein to a granulator is to a device for forming granules or pellets of fertilizer product. Commonly used granulators are described in Perry's Chemical Engineers' Handbook, chapter 20 (1997). Preferred granulators are drum granulators or pan granulators. Typically, the mixture is pumped and distributed on a rolling bed of material in a drum granulator. In the granulator, granules are formed. Reference herein to granules is to discrete particles comprising ammonium phosphate and elemental sulphur. Optionally, ammonia can be introduced in the granulator to complete the ammoniation of the ammonium phosphate mixture. Optionally, water and steam can also be fed to the granulator to control the temperature of the granulation process as needed.

Optionally, additional ammonia and/or recycled fertilizer particles may be added to the granulator unit. Recycled fertilizer particles add granulation and nucleating agents. They are obtained from the final fertilizer product. Suitably they have small particle sizes (so-called off-spec fines). The recycle of fines is also described in U.S. Pat. No. 3,333,939.

Other ingredients may be added during the manufacturing process to tailor the fertilizer products to their intended end-use. Examples include plant micro nutrients such as boron, potassium, sodium, zinc, manganese, iron, copper, molybdenum, cobalt, calcium, magnesium and combinations thereof. These nutrients may be supplied in elemental form or in the form of salts, for examples as sulphates, nitrates or halides. In this way, granules enriched in plant nutrients are obtained. The amount of plant micronutrients depends on the type of fertilizer needed and is typically in the range of between 0.1 to 5%, based on the total weight of the granules.

The sulphur-containing ammonium phosphate granules obtained after the granulation step are optionally dried in a drying unit. In a preferred embodiment, the granules are air-dried in the drying unit, thereby avoiding the need for additional drying equipment. Alternatively, drying units wherein heat transfer for drying is accomplished by direct contact between the wet solid and hot gases are used, thereby enabling a faster drying step. Typically, the drying unit is a rotary dryer.

In a preferred process according to the invention, the granules are sorted on their size in a sorting unit to achieve a more uniform size distribution. Typically, oversized granules are crushed and returned to the sorting unit while undersized granules are returned to the granulator as so-called off-spec fines. A preferred size range for the granules is between about 1.5 and 5.0 mm, more preferably between about 2 and 4 mm, expressed as the average diameter of the granules. The use of granules which fall within this range is more likely to enable a more even distribution of the fertilizer ingredients in the soil after applying the granules to the soil.

It will be appreciated that the process parameters in the reactor unit and in the granulator unit have to be adjusted depending on the desired products.

After a typical manufacturing process according to the invention, sulphur-containing monoammoniumphosphate, sulphur-containing diammoniumphosphate or sulphur-containing NPK (nitrogen-phosphorous-potassium) fertilizer granules, optionally enriched in plant nutrients, are obtained. The sulphur in the sulphur-containing fertilizer granules according to the invention may be incorporated into the fertilizer granules, or the sulphur may be distributed on the granules or the sulphur may be both incorporated into the granules and be distributed on the granules. The content of elemental sulphur in these fertilizer granules is typically up to 25%, based on the total weight of the fertilizer, preferably between 2 and 18%, more preferably between 5 and 15%. An elemental sulphur content higher than 25% will generally lead to a less even distribution of sulphur on and throughout the granules, due to clustering of elemental sulphur. In addition, the crush strength of granules decreases with an increasing elemental sulphur content. The most homogeneous distribution of sulphur on and throughout the granules is achieved when the content of elemental sulphur is between 5 and 15%, based on the total fertilizer granule.

The invention will now be illustrated by means of the schematic FIGURE.

The FIGURE depicts a typical process scheme of the process according to the invention, wherein the elemental sulphur is introduced in step (a).

Phosphoric acid is led from tank (1) via line (2) to a reactor (3). Gaseous ammonia is led from tank (4) via line (5) to reactor (3). Water is led from tank (6) via line (7) to reactor (3). Sulphur is led from tank (8) via line (9) to reactor (3).

In reactor (3), the anhydrous ammonia and phosphoric acid are reacted to form a sulphur-containing ammonium-phosphate mixture. This mixture is pumped via line (10) to a drum granulator (11), where it is introduced on top of a rolling bed of fertilizer material. Gaseous ammonia is led from tank (4) via line (12) into the drum granulator to increase the mole ratio to approximately 1.8 or 1.0 when producing S-DAP or S-MAP respectively.

In granulator (11), moist sulphur-containing ammonium-phosphate granules are formed. The moist granules are led via line (13) to a rotary dryer (14). In the rotary dryer (14), the granules are dried. The dried granules are led via line (15) to a sizing unit (16).

In the sizing unit, granules that are too large or too small, relative to a pre-determined granules size, are removed from the granules stream. The oversized granules are led via line (17) to a crusher (18) where they are crushed. The crushed granules are returned via line (19) to the sizing unit. The undersized granules are recycled via line (20) to the granulator. The granules with a size range of between 2.0 and 4.0 mm are led via line (21) to a cooler (22) where they are cooled. A portion of granules with a size range of between 2.0 and 4.0 mm is recycled via line (23) to the drum granulator to help control the granulation process.

Ammonia and water vapours escaping from reactor (3) are led via line (24) to a wet scrubber unit (25), where they are scrubbed with phosphoric acid. The scrubber liquid containing ammonium phosphate is led back via line (26) to reactor (3).

The air and dust collected from the drum granulator, dryer discharge elevator and drum granulator surroundings are led via lines (27) and (28) to a suitable commercially available wet scrubber (29) where they are treated and then vented via line (30) to the atmosphere.

The invention will now be illustrated by means of the following non-limiting examples.

EXAMPLE 1

Comparative

DAP granules without added sulphur were prepared using the process according to schematic FIG. 1, but without added sulphur from tank (8). A preneutralizer reactor was used as reactor (3). The reaction mixture in the preneutralizer reactor was maintained at 115° C., with a $NH_3:H_3PO_4$ mole ratio of 1.42. Chemical analysis of the resulting granules indicated 19.0% N, 50.5% $P_2O_5$ and 0.9% sulphate sulphur (expressed as weight percentages based on the total weight). The average crush strength of the granules, the minimum force required to crush an individual granule, was 4.7 kg/granule.

EXAMPLE 2

According to the Invention

DAP granules with added sulphur were prepared using the process according to schematic FIG. 1. The reactor used was a preneutralizer reactor. The reaction mixture in the preneutralizer reactor was maintained at 117° C., with a $NH_3:H_3PO_4$ ratio of 1.44. Chemical analysis of the resulting granules indicated 15.7% N, 41.8% $P_2O_5$, 0.6% sulphate sulphur and 17.6% elemental sulphur (expressed as weight percentages based on the total weight). Scanning electron microscopy (SEM) analysis was performed to evaluate if the added sulphur was evenly dispersed in the fertilizer granules. SEM analysis of the granules and of split granules indicated that the sulphur was distributed both on the surface of the granules and throughout the granules. The average crush strength of the granules was 4.3 kg/granule.

EXAMPLE 3

Comparative

MAP granules without added sulphur were prepared using the process according to schematic FIG. 1, but without added sulphur from tank (8). A pipe cross reactor was used as reactor (3). The reaction mixture in the pipe cross reactor was maintained between 120 and 126° C., with a $NH_3:H_3PO_4$ mole ratio of 0.67. Chemical analysis of the resulting granules indicated 11.3% N, 56.0% $P_2O_5$ and 1.0% sulphate sulphur (expressed as weight percentages based on the total weight). The average crush strength of the granules was 4.8 kg/granule.

EXAMPLE 4

According to the Invention

MAP granules with added sulphur were prepared using the process according to schematic FIG. 1. The reactor used was a pipe cross reactor. Sulphur was added as emulsified sulphur. The emulsified sulphur was agitated in a container and then transferred directly from the container to the sulphur feed tank (8). The reaction mixture in the pipe cross reactor was maintained at about 122° C., with a $NH_3:H_3PO_4$ ratio of 0.69. Chemical analysis of the resulting granules indicated 10.3% N, 50.3% $P_2O_5$, 0.7% sulphate sulphur and 11.0% elemental sulphur (expressed as weight percentages based on the total weight). Scanning electron microscopy (SEM) analysis was performed to evaluate if the added sulphur was evenly dispersed in the fertilizer granules. SEM analysis of the granules and of split granules indicated that the sulphur was distributed both on the surface of the granules and throughout the granules. The average crush strength of the granules was 4.2 kg/granule.

That which is claimed is:

1. A process for the manufacture of sulphur-containing fertilizers, the process comprising the steps of:
   (a) bringing a liquid phase comprising elemental sulphur into contact with ammonia, phosphoric acid and water in a reactor unit to obtain an ammonium phosphate mixture, wherein the elemental sulphur is introduced into the reactor unit substantially at the same time as the other reactants;
   (b) introducing the mixture obtained in step (a) into a granulator unit to obtain granules.

2. A process according to claim 1, wherein the granules obtained after step (b) are dried in a drying unit.

3. A process according to claim 2, wherein the reactor unit in step (a) is a pipe cross reactor unit or a preneutralizer.

4. A process according to claim 3, wherein the elemental sulphur is introduced as a slurry of sulphur particles in water.

5. A process according to claim 4, wherein the elemental sulphur is introduced as molten sulphur, the temperature of the mixture being kept above 113° C.

6. A process according to claim 5, wherein the ammonia is anhydrous gaseous ammonia or a concentrated solution of ammonia in water.

7. A process according to claim 6, wherein a potassium salt and/or other plant nutrients has been added to the fines.

8. A process according to claim 7, wherein the elemental sulphur is biologically produced elemental sulphur.

9. A process according to claim 3, wherein the elemental sulphur is introduced as a slurry of sulphur particles in water, the particle size of the sulphur particles being between 0.5 and 150 microns.

10. A process according to claim 9, wherein the elemental sulphur is introduced as molten sulphur, the temperature of the mixture being kept above 113° C.

11. A process according to claim 10, wherein the ammonia is anhydrous gaseous ammonia or a concentrated solution of ammonia in water.

12. A process according to claim 11, wherein a potassium salt and/or other plant nutrients has been added to the fines.

13. A process according to claim 12, wherein the elemental sulphur is biologically produced elemental sulphur.

14. A process according to claim 3, wherein the elemental sulphur is introduced as a slurry of sulphur particles in water, the particle size of the sulphur particles being between 1.0 and 100 microns.

15. A process according to claim 14, wherein the elemental sulphur is introduced as molten sulphur, the temperature of the mixture being kept above 113° C.

16. A process according to claim 15, wherein the ammonia is anhydrous gaseous ammonia or a concentrated solution of ammonia in water.

17. A process according to claim 16, wherein a potassium salt and/or other plant nutrients has been added to the fines.

18. A process according to claim 17, wherein the elemental sulphur is biologically produced elemental sulphur.

* * * * *